United States Patent
Gibson et al.

(10) Patent No.: US 7,259,603 B2
(45) Date of Patent: *Aug. 21, 2007

(54) SWITCH MODE POWER CONVERTER

(75) Inventors: Neil Gibson, Freising (DE); Joerg Kirchner, Mauern (DE); Kevin Scoones, Munich (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/080,327

(22) Filed: Mar. 15, 2005

(65) Prior Publication Data

US 2005/0218874 A1   Oct. 6, 2005

(30) Foreign Application Priority Data

Mar. 30, 2004   (DE) ............... 10 2004 015 621

(51) Int. Cl.
H03K 5/12   (2006.01)
(52) U.S. Cl. .................. 327/170; 323/282; 363/15
(58) Field of Classification Search ........ 323/282–290, 323/222–224, 266; 363/19–20, 26, 80, 74, 363/78; 327/170–175
See application file for complete search history.

(56) References Cited

U.S. PATENT DOCUMENTS

| 4,347,474 A | * | 8/1982 | Brooks et al. ............... 323/224 |
| 5,600,234 A | * | 2/1997 | Hastings et al. ............ 323/282 |
| 6,198,265 B1 | | 3/2001 | Stevenson |

FOREIGN PATENT DOCUMENTS

DE   68919764 T2   12/1994
EP   0993104 A2   4/2000

OTHER PUBLICATIONS

Mattingly "Designing Stable Compensation Networks for Single Phase Voltage Mode Buck Regulators" In: Technical Brief TB417.1, Dec. 2003.

* cited by examiner

Primary Examiner—Rajnikant B. Patel
(74) Attorney, Agent, or Firm—Wade J. Brady, III; Frederick J. Telecky, Jr.

(57) ABSTRACT

A switch mode power converter is provided which includes a switching cell with a supply input, an output and a control input. A summing comparator has first and second differential input pairs and an output. The output is connected to the control input of the switching cell. An oscillator provides a periodic waveform that is applied to a first one of the inputs of the first differential input pair of the summing comparator. An adjustable reference voltage source provides an adjustable reference voltage a predetermined fraction of which is applied to a second one of the inputs of the first differential input pair of the summing comparator. An error amplifier has differential outputs coupled to the second pair of differential inputs of the summing comparator and a differential input pair. A first input of the differential input pair is coupled to the output of the switching cell, and the adjustable reference voltage from the adjustable reference voltage source is applied to a second input of the differential input pair. Thus, the desired DC voltage is scaled to produce a DC reference for the comparator which generates the desired duty cycle for the pulse signal that drives the switching cell, and thus the desired regulated output voltage, with only minor corrections required across the error terminals to correct small parasitic terms.

9 Claims, 1 Drawing Sheet

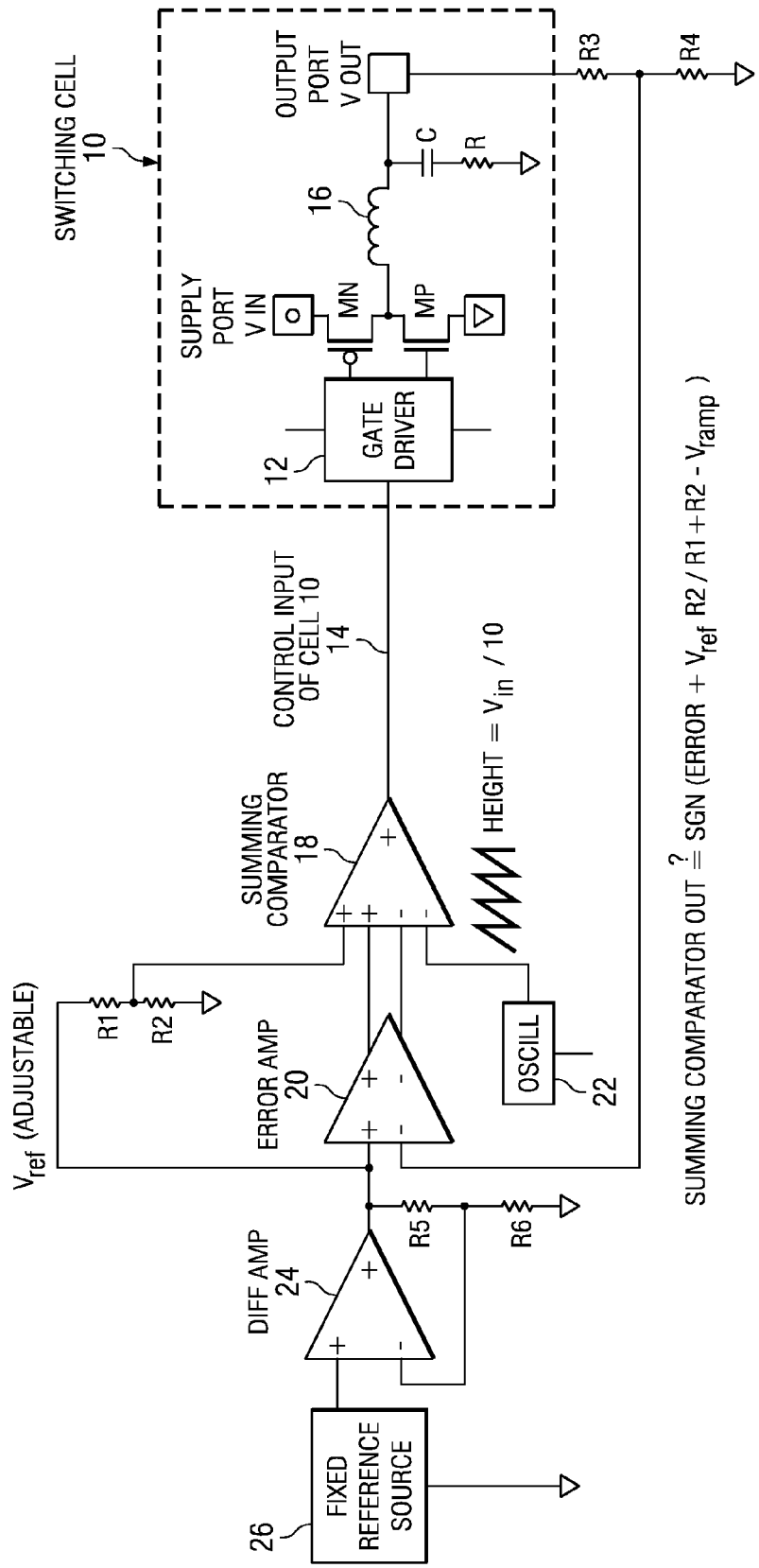

SWITCH MODE POWER CONVERTER

CROSS REFERENCE TO RELATED APPLICATIONS

This application claims priority under 35 USC § 119 of German Application Serial No. 102004015621.2, filed Mar. 30, 2004.

FIELD OF THE INVENTION

The present invention relates to a switch mode power converter and, in particular, to a DC-DC buck converter.

BACKGROUND OF THE INVENTION

Typical prior art switch mode power converters have a supply input and an output that provides a regulated supply voltage. U.S. Pat. No. 5,600,234 shows a DC-DC buck converter with a switching cell that transforms an input voltage to a regulated supply voltage lower than the input voltage. The switching cell is controlled by a pulse signal that has a fixed period and a variable duty cycle. The pulse signal is provided by a summing comparator. The summing comparator has a first differential input pair to which a saw-tooth waveform signal is applied that determines the fixed period of the pulse signal. The duty cycle of the pulse signal is set by a first feedback loop that feeds the a fraction of the voltage at the output of the switching cell to an inverting input of the summing comparator, and by a second feedback loop that includes an integrating differential amplifier. While the first feedback loop ensures a fast transient response, it also introduces a DC error. The second feedback loop has a high gain but slow transient response to correct for the DC error and provide a stable steady-state operating point.

SUMMARY OF THE INVENTION

The present invention takes a different approach with a single feedback loop to provide a higher intrinsic DC accuracy and permit an implementation without an integrator.

Specifically, the present invention provides a switch mode power converter which comprises a switching cell with a supply input, an output and a control input. A summing comparator has first and second differential input pairs and an output. The output is connected to the control input of the switching cell. An oscillator provides a periodic waveform that is applied to a first one of the inputs of the first differential input pair of the summing comparator. An adjustable reference voltage source provides an adjustable reference voltage a predetermined fraction of which is applied to a second one of the inputs of the first differential input pair of the summing comparator. An error amplifier has differential outputs coupled to the second pair of differential inputs of the summing comparator and a differential input pair. A first input of the differential input pair is coupled to the output of the switching cell, and the adjustable reference voltage from the adjustable reference voltage source is applied to a second input of the differential input pair. Thus, the desired DC voltage is scaled to produce a DC reference for the comparator which generates the desired duty cycle for the pulse signal that drives the switching cell, and thus the desired regulated output voltage, with only minor corrections required across the error terminals to correct small parasitic terms.

In a preferred embodiment, a fixed fraction of an output voltage developed at the output of the switching cell is applied to the first differential input of the error amplifier. Thus, the power train operates at a fixed gain, and is thus optimally compensated for all output voltages.

In a further improvement of this concept, the adjustable reference voltage source comprises a fixed reference source and an adjustable gain amplifier. A fixed reference voltage from the fixed reference voltage source is applied to an input of the amplifier and an output of the amplifier provides the adjustable reference voltage.

Typically, the power converter is a DC-DC buck converter implemented as an integrated CMOS circuit. In such an implementation, a resistive voltage divider in the feedback loop of the adjustable gain amplifier would be external to the integrated circuit, thus facilitating access to the components of the voltage divider for the purpose of adjusting the desired output voltage.

In a further embodiment, the periodic waveform provided by the oscillator is a saw-tooth waveform with a ramp height which is a fixed fraction of an input voltage at the supply input.

Further advantages and features of the invention will become apparent from the following detailed description of a preferred embodiment with reference to the drawing.

BRIEF DESCRIPTION OF THE DRAWINGS

The single FIGURE of the drawing is a schematic circuit diagram of a switch mode power converter according to this invention.

DETAILED DESCRIPTION OF THE DRAWINGS

With reference to the single FIGURE, a DC-DC buck converter is shown with a switching cell 10 that has a supply port for an input voltage Vin and an output port for an output voltage Vout. Switching cell 10 has a pair of push-pull transistors MN and MP connected between the supply port and ground and a gate driver 12 with outputs connected to the gates of transistors MN and MP and a control input 14. The connecting node between transistors MN and MP is connected to the output port through an inductor 16. A capacitor C and a resistor R are connected in series between the output port and ground.

A summing comparator 18 has an output connected to the control input 14 of switching cell 10 and two pairs of differential inputs. The first pair of differential inputs (the "inner" inputs in the FIGURE) are connected to differential outputs of an error amplifier 20. The inverting input of the second pair is connected to the output of an oscillator 22 that generates a saw-tooth waveform at a fixed frequency. The non-inverting input of the second pair is connected to a tap node of a resistive divider that includes series-connected resistors R1 and R2.

A fixed fraction of the demanded output voltage Vout is taken from a resistive divider with resistors R3 and R4 connected in series between the output port and ground, and is supplied to an inverting input of error amplifier 20. An adjustable reference voltage Vref is applied to the non-inverting input of error amplifier 20 and to resistor R1 at its terminal opposite its connection with resistor R2. The adjustable reference voltage Vref is provided by the output of a differential amplifier 24 the gain of which is adjusted by a feedback loop comprising resistors R5 and R6 connected is series between the output of amplifier 24 and ground, the connection node between resistors R5, R6 being connected to the inverting input of amplifier 24. A fixed voltage from a fixed reference voltage source 26 is applied to the non-inverting input of amplifier 24.

The converter is preferably implemented as an integrated CMOS circuit. While most of the components shown in the FIGURE will be incorporated in the integrated circuit (except for the LC filter formed by inductor 16 and capacitor C), the resistive divider comprising resistors R5 and R6 will be external to the integrated circuit.

In operation, the summing comparator 18 compares the ramp voltage from oscillator 22 with a fixed fraction of the adjustable reference voltage Vref. If the fixed fraction of the reference voltage Vref is half the ramp height of the saw-tooth signal, the output of summing comparator provides a pulse signal with a 50:50 duty cycle. A larger or lower reference voltage Vref would shift the cross-point of summing comparator 18, resulting in a corresponding change of the duty cycle. The pulse signal from comparator 18 is amplified in gate driver 12 so switch transistors MN and MP alternatingly on and off, thereby producing output voltage Vout as is well known. The outputs from error amplifier 20 also act to shift the cross-point in summing comparator 18 to correct any error in output voltage Vout. However, the DC accuracy of the inventive power converter is inherently high, and so only minor corrections are necessary to correct small parasitic terms. As a result, a regulated output voltage Vout is obtained the level of which may be adjusted with high accuracy in a wide range by adjusting the reference voltage Vref with external resistors R5 and R6.

In the preferred embodiment, the ramp height of the saw-tooth signal from oscillator 22 is proportional to the level of the input voltage Vin at the supply input. As is well known, the gain of a modulator as disclosed is equal to the Supply Voltage divided by the ramp height. Having a supply voltage of 2.5 thru 6 volts gives a variation in the gain of 7.6 dB over the supply voltage range. From a 'load regulation' point of view, the worst case situation is low supply voltage. From a control-loop stabilization point of view the worst case is high supply voltage. Making the ramp height proportional to the supply results in a constant gain for the modulator. In a specific embodiment, a default ramp height of Vin/10 is used.

Specific advantages of the invention will now be discussed in more detail.

In the embodiment disclosed, the power train has a fixed closed loop gain. A fixed closed loop gain in the power amplifier will give a constant 'small-signal' transient response irrespective of the programmed output voltage. The voltage regulation, when expressed as a percentage of the output voltage becomes better for higher output voltages, as the effective open loop gain of the power stage is constant e.g. at +20.

The compensation of the power amplifier becomes simpler, as the bandwidth of the loop is now only a function of internal constants and the external LC filter, whereas in the more conventional approach the above holds true, but there is the additional factor of the variable gain.

The resistor defining the gain=+1.5 in the power amplifier is internal. Thus it can be physically close to the error amplifier thus reducing the possibility of noise pickup. Being internal also reduces the parasitic pole due to the resistance looking back into the tap point of the resistor multiplied by the bond pad capacitance. A 1 pF bond-pad and a 200 kOhm tap point resistance gives rise to a 317 KHz pole.

The internal feedback in the power stage also permits the use of capacitive division to further reduce the impedance at the tap point, and furthermore push out the pole formed by the impedance looking into the tap point and the input capacitance of the error amplifier.

The ground reference for the internal feedback is common to the bandgap limiting the scope for noise injection. In the conventional case the ground reference for the power stage gain setting resistors and the bandgap only meet up off chip where any noise appearing between these two 'grounds' is amplified up by the inverting gain of the power stage. For example, if the bandgap is 0.6 volts and the output voltage is 2.4, the closed loop power stage non-inverting gain is 4, and therefore the inverting gain is −3, and so a 10 mV noise signal appearing between the internal bandgap's reference and the external 'ground' reference will be amplified by −3 to appear as 30 mV noise at the output.

Although this new approach still has external resistors setting the output voltage by means of programming the reference voltage to the fixed gain power stage, this gained up noise can be passively filtered by an internal R & C, the phase shift of which does not appear in the power stage's compensation equations.

In a conventional approach, the main source of error in output voltage is going to be because the summing comparator is always comparing the ramp against the 'mid-ramp' signal. As we are generating a reference proportional to the output voltage, it now becomes possible to generate a reference for the summing comparator which is no longer 'mid-ramp' but which is equal to 'one-tenth-of-the demanded-Vout'. Thus the duty-cycle being naturally generated by the summing comparator will be Vout/Vin, giving an output voltage of exactly Vout. This favorable presentation makes no account of losses and imperfections in the system and it transpires that there will be a small offset at the input of the error amplifier.

The invention claimed is:

1. A switch mode power converter comprising:
a switching cell with a supply input, an output and a control input,
a summing comparator having first and second differential input pairs and an output, the output being connected to the control input of the switching cell,
an oscillator providing a periodic waveform that is applied to a first one of the inputs of the first differential input pair of the summing comparator,
an adjustable reference voltage source providing an adjustable reference voltage a predetermined fraction of which is applied to a second one of the inputs of the first differential input pair of the summing comparator, and
an error amplifier having differential outputs coupled to the second pair of differential inputs of the summing comparator and a differential input pair, a first input of said differential input pair being coupled to the output of the switching cell, the adjustable reference voltage from the adjustable reference voltage source being applied to a second input of said differential input pair.

2. The power converter according to claim 1, wherein a fixed fraction of a demanded output voltage developed at the output of the switching cell is applied to the first differential input of the error amplifier.

3. The power converter according to claim 1, wherein the adjustable reference voltage source comprises a fixed reference source, an adjustable gain amplifier having an input and an output, a fixed reference voltage from the fixed reference voltage source being applied to said input and said output providing the adjustable reference voltage.

4. The power converter according to claim 3, and further comprising a resistive voltage divider connected to the output of the adjustable gain amplifier and providing said predetermined fraction of the adjustable reference voltage.

5. The power converter according to claim 3, wherein the adjustable gain amplifier has a feedback loop with an adjustable resistive voltage divider.

6. The power converter according to claim 5 and being implemented as an integrated CMOS circuit, the resistive voltage divider being external to the integrated circuit.

7. The power converter according to claim 1, wherein the periodic waveform provided by the oscillator is a saw-tooth waveform.

8. The power converter according to claim 7, wherein the saw-tooth waveform has a ramp height which is a fixed fraction of an input voltage at the supply input.

9. The power converter according to claim 1, being a DC-DC buck converter and comprising an inductor and a capacitor in the switching cell.

* * * * *